3,597,369
POLYETHERS WHICH ARE COPOLYMERS BASED ON TETRAMETHYLETHYLENE OXIDE AND PROCESS OF MAKING SAME
George Edward Foll, Runcorn, England, assignor to Imperial Chemical Industries Limited, London, England
No Drawing. Filed Feb. 16, 1966, Ser. No. 527,758
Claims priority, application Great Britain, Mar. 8, 1965, 9,735/65; July 28, 1965, 32,266/65; Dec. 9, 1965, 52,335/65

Int. Cl. C08g *23/06*

U.S. Cl. 260—2  17 Claims

ABSTRACT OF THE DISCLOSURE

Thermoplastic polyethers of improved thermal stability and elevated melting point are obtained by copolymerizing 25% to 75% by weight of tetramethylethylene oxide with from 75% to 25% by weight of a cyclic 1,2-epoxide such as cyclohexene 1,2-epoxide and/or 4-vinyl cyclohexene-1,2-epoxide, an epihalohydrin, a butene-2-oxide or a 1-methyl or 1,1-dimethyl derivative thereof, or a mixture of a cyclic 1,2-epoxide with an epihalohydrin and/or 1,2-dialkylethylene oxide.

---

The present invention relates to synthetic organic polymers and more particularly to polyethers.

Polymers of alkylene oxides having four or more carbon atoms are known to be liquids, waxy solids or elastomers which generally melt below or very little above 150° C. An exception is the polyether derived from tetramethyl ethylene oxide which is described as a hard brittle white solid but this is infusible even at 300° C. and therefore presents considerable problems in mouling and extrusion by conventional means. We have now found that by copolymerising tetra-(hydrocarbon-) substituted ethylene oxides with a limited class of other epoxides, thermoplastic materials with a useful combination of physical properties, melting or softening point, thermal stability and inertness to acids and bases may be obtained.

According to the present invention we provide a copolymer derived by polymerising a mixture comprising (i) at least 1% by weight of a tetra-(hydrocarbon-) substituted ethylene oxide and (ii) at least 1% by weight of at least one oxirane selected from epihalogenhydrins and epoxides other than (i) wherein each epoxy carbon atom is linked to another carbon atom which is not part of an aromatic cyclic system. Copolymers as described above but which have been modified by the inclusion in the polymer chains of minor proportions of residues of other epoxide material copolymerisable with (i) and (ii) are also included. By minor proportions we mean proportions that do not exceed those of either of constituents (i) or (ii).

The hydrocarbon groups linked to the epoxidised carbon atoms of the tetra-(hydrocarbon-) substituted ethylene oxide (hereinafter referred to for convenience as the substituted ethylene oxide) may be alkyl, aryl, aralkyl or alkaryl, where the term alkyl also includes cycloalkyl. These four hydrocarbon groups may be the same or different but it is preferred to use substituted ethylene oxides in which all the substituents are the same because of the ease of their preparation. Conveniently the hydrocarbon groups are lower alkyl (i.e. methyl, ethyl, isomeric propyl or isomeric butyl) or phenyl. In general the ease of preparation of these epoxides decreases as the size of the alkyl substituent increases and for this resason the most preferred tetra-substituted ethylene oxide is the tetramethyl ethylene oxide. Furthermore, the polymeric materials derived from this epoxide have properties which are of particular interest in a synthetic organic thermoplastic. Mixtures of our specified tetra-substituted ethylene oxides may be used if desired.

Examples of oxiranes which form the copolymer with the tetra-(hydrocarbon-) substituted ethylene oxide according to our invention include epichlorohydrin and epibromohydrin; epoxides of linear alkenes wherein each epoxy carbon atom is linked to a carbon atom which is not part of an aromatic cyclic system, particularly 1,2-dialkyl ethylene oxides for example isomeric butene-2-oxides, isomeric pentene-2-oxides and isomeric 4-methylpentene-2-oxides and oxiranes which are epoxides of ethylenically unsaturated cyclic compounds, particularly those having the structure:

$$\mathrm{H-C}\underset{R}{\overset{O}{\diagup\!\!\diagdown}}\mathrm{C-H} \quad \text{(I)}$$

where R is a divalent organic radical having a chain of from 3 to 6 carbon atoms linking the epoxidised carbon atoms.

The cis and trans isomers of the 1,2-dialkyl ethylene oxides may be used in admixture or separately, as desired.

The physical properties of our copolymers depend upon the monomers from which they are derived and their relative concentrations in the polymerisable mixture. The copolymers from tetramethyl ethylene oxide are mostly water-white and range from rubbery soluble materials to relatively rigid insoluble materials having high melting points or softening points and from soft, pliable materials very much akin to low density polyethylene in character and feel to hard strong materials which tend to exhibit brittle fractures. They also show marked thermal stability, being in general stable in air at temperatures of 200° C. or even more.

As one particular embodiment within the broad scope of our invention, we provide binary copolymers of tetra-(hydrocarbon-) substituted ethylene oxides, and particularly tetramethyl ethylene oxide (TMO), with oxiranes which are epoxides of ethylenically unsaturated cyclic compounds and have the structure I above; for example, cyclopentene-1,2-oxide, cyclohexene - 1,2 - oxide (CHO), cycloheptene-1,2-oxide, cyclooctene-1,2-oxide, cyclopentadiene diepoxide, cyclohexene-1,2-oxide-4-carboxylate, 4-vinyl cyclohexene - 1,2 - oxide, 3-chlorocyclohexene-1,2-oxide, cycloocta - 1,2,5,6 - diene - 1,2 - oxide and bicyclo-(2.2.2.)oct-2-ene-2,3-oxide. It will be appreciated that those containing two or more epoxide groups may form cross-linked resins during the course of the polymerisation. On the other hand those epoxides containing ethylenic unsaturation and a single epoxide group may form linear polymers during the initial polymerisation but may be subjected thereafter to crosslinking conditions activating the ethylenic double bond. A particular example of the latter case is 4-vinyl-cyclohexene-1,2-oxide. Polymers from this epoxide and/or the parent CHO with tetramethyl ethylene oxide have very suitable combinations of melting points, thermal stability, strength and solubility and may also exhibit useful inertness to acids and bases.

These polymeric materials may contain from 1–99% by weight of oxirane material having the structure:

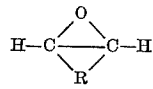

as hereinbefore defined. In general, increase in the amount of the said oxirane material in the polymer decreases the softening point of the polymer and increases its solubility; it may also affect the chemical inertness of the polymer. In addition, such increase may reduce the crystallinity of the product and introduce some rubberiness, particularly where the amount of comonomer exceeds about 75% by weight. Copolymers having a particularly attractive combination of properties for applications as thermoplastic moulding materials generally contain from 25–75% by weight of said oxirane material. These copolymers will generally exhibit melting points of 150° C. and above and frequently up to about 270° C. and may exhibit partial crystallinity. The polymers which are solid may be moulded and extruded by conventional thermoplastic techniques, melt spun or melt cast and, since many of them are soluble, they may also be cast into films or spun into fibres from solution. It is generally preferred to use polymers having intrinsic viscosities of at least 1.0 for these operations.

Copolymers from 4-vinyl-cyclohexene-1,2-oxide, CHO and TMO are also of particular interest because of their combination of good physical properties with the ability to be cross-linked. The preferred materials are derived from mixtures containing from 1 to 10% by weight of 4-vinyl cyclohexene-1,2-oxide, 30–50% by weight of CHO and 40–60% by weight of TMO, the amounts being chosen to total 100.

In another particular embodiment of our invention, we provide copolymers derived from a polymerisable mixture comprising (i) at least 1%, and generally at least 25%, by weight of a tetra- (hydrocarbon-) substituted ethylene oxide and (ii) at least 1%, and generally at least 25%, by weight of oxirane material having the structure:

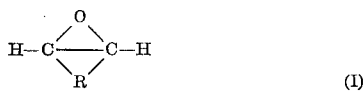

(1)

where R is a divalent organic radical having a chain of from 3 to 6 carbon atoms linking the epoxidised carbon atoms together with from 0.5% to 40% (and preferably from 2 to 15%) by weight of oxirane material selected from epihalogenhydrins and 1,2-dialkyl ethylene oxides.

Of particular interest are those derived from TMO, CHO and one of epichlorhydrin, epibromhydrin and isomers of butene-2-oxide, pentene-2-oxide and 4-methylpentene-2-oxide. Those in which TMO forms about 50 mole percent of the polymerisable monomer are preferred especially.

These copolymers differ from those derived from TMO and CHO alone in that they are generally more pliable in nature and are even more readily fabricated on conventional machinery for shaping thermoplastics. In particular, when sufficient of the third component is present, film made from the polymers may be subjected to repeated creasing without tearing. In other ways also, the polymers generally show properties very similar to low density polyethylene but their softening points and thermal stability are in general much improved over that of low density polyethylene and some exhibit good oxidative and dimensional stability at temperatures of 200° C. or more without the need for antioxidants. The solid copolymers may be moulded and extruded by conventional thermoplastic techniques and melt spun or melt cast. Those that are soluble may also be cast into films or spun into fibers from solution. Copolymers from TMO, CHO and 4-methylpentene-2-oxide give very good films and may also be used as melt adhesives.

In order to obtain a significant improvement in strength, the copolymers should contain at least 0.5 mole percent and generally at least 2 mole percent of the third component but those containing very much larger quantities, and particularly in excess of 15 mole percent, generally have low softening points. With some third components, particularly those containing α-hydrogen atoms, the oxidative stability at elevated temperatures may also be reduced.

Replacement of at least some of the CHO by 4-vinyl cyclohexene-1,2-oxide will provide cross-linkable polymers of otherwise similar properties. It is preferred that the polymerisable mixture should contain from 1 to 10% by weight of this component when it is used.

In yet another particular embodiment of our invention we provide binary copolymers of TMO with an epihalogenhydrin. These are generally water-white in colour and those containing sufficient epihalogenhydrin and of sufficiently high molecular weight (i.e. generally having an intrinsic viscosity of at least 0.8) may be formed into films which are transparent, highly flexible and also very pliable, being readily folded to desired formations. The preferred polymers contain from 75% to 25% by weight of TMO.

Highly flexible materials may be obtained by forming binary copolymers of TMO with one or more of the isomers of butene-2-oxide, pentene-2-oxide or 4-methylpentene-2-oxide. These are also white in general and may be formed into transparent films. In flexibility, they generally lie between the copolymers of TMO with epichlorohydrin and the tercopolymers of TMO, CHO and the epoxide concerned, being less flexible than the former but more flexible than the latter. Films from copolymers of TMO with pentene-2-oxide may be subjected to considerable stretching at room temperature before they break. The copolymers containing from 25% to 75% by weight of TMO and generally about 50 mole percent of TMO are preferred. Copolymers having an intrinsic viscosity of at least 0.8 are preferred where good physical properties are desired.

The copolymers of our invention may be prepared by polymerising the monomers under cationic conditions. In general, this involves contacting the polymerisable mixture with a cationic initiator below −50° C.

Conveniently the polymerisation is effected with the monomers dissolved in a suitable organic solvent which is inert in that it does not prevent polymerisation. Any inert organic solvent which is liquid at the temperature of polymerisation may be used and we have found that both non-polar and polar liquids are effective. Examples include the hydrocarbons, e.g. benzene, toluene, the xylenes and linear alkanes, particularly pentane and hexane, and chlorinated hydrocarbons, e.g. methylene chloride. Suitable amounts of solvent may range from 1 to 25 parts per part of polymerisable material although higher or lower concentrations may be used, if desired. Little or no useful polymerisation occurs above −50° C. and where it is desired to obtain polymers of high molecular weight it is preferred to operate below −70° C.

Any cationic polymerisation initiator may be used and examples are Friedel-Crafts catalysts, for example the halides of metals of Groups 2–B, 3–B, 4–B, 5–B and 8 of the Periodic Table and boron but we have found that compounds wherein a monovalent alkyl radical is linked to a metal of Group 2 of the Periodic Table or to aluminium are particularly effective. Examples of such metal-alkyl compounds are the dialkyls, the monoalkyl monohydrides, the alkyl phenyls and the alkyl halides of beryllium, magnesium, calcium, zinc, cadmium and mercury and the monoalkyl dihalides and the dialkyl monohalides and the trialkyls of aluminium. Aluminium triethyl is particularly effective either as such or modified as described in our co-pending applications Nos. 46,587/64 and 46,588/64. Since these initiators are sensitive to oxygen and because water tends to inhibit the polymerisation the process should be effected in dry apparatus from which oxygen has been purged, for example, by purging with an inert gas such as nitrogen. The polymerisation is normally effected under an atmosphere of nitrogen (or other inert gas) to ensure that the presence of oxygen is minimised. The initiators are usually used in amounts of from 0.01 to 10 moles per 100 moles of polymerisable material, 0.5 to 5 moles per 100 being preferred in most circumstances.

The polymerisation reaction is generally highly exothermic and therefore it is preferred to add the catalyst solution slowly to a solution of the monomer in an inert organic diluent so as to control the temperature conditions within the reactor. Polymerisation is generally rapid and is frequently completed within 4–6 hours of initiation. The reaction is conveniently effected at atmospheric pressure although lower or higher pressures may be used if desired.

On completion of the polymerisation the reaction vessel may be allowed to warm to room temperature whereupon the polymer suspension may be discharged and the polymer separated, washed and dried. Conveniently the polymer suspension may be poured into an alcohol, preferably acidified, in order to destroy catalyst residues before the product is filtered. Equally the polymer suspension may be poured into an acid alcoholic solution before it is warmed to room temperature. The filtered product may then be washed, for example with methanol, and dried, preferably under vacuum and preferably at elevated temperatures.

Depending on molecular weight and constitution, our products vary from rubbery solids to strong high-softening thermoplastic materials. These last are particularly useful for conversion to shaped objects, e.g. films, fibres and mouldings, and before shaping may be blended with additives such as heat and light stabilisers, fillers, plasticisers, pigments, dyes and other natural or synthetic plastic materials. Cross-linking agents may also be added to compositions containing polymers from vinyl cyclohexene oxide. The solid, strong, high molecular weight materials are particularly suitable for formation into film which may be used, for example, as a dielectric.

The invention is illustrated but in no way limited by the following examples in which all parts are expressed as parts by weight. Melting points were measured using differential thermal analysis techniques. Physical properties such as brittle strength, yield stress, modulus, elongation at break and elognation to yield were measured on a Davenport Tensile Tester using an extension rate of 2 inches per minute and a dog-bone shaped specimen the length of which between shoulders was 1 inch, the width of the neck being ¼ inch. Intrinsic viscosities were recorded on solutions of the polymers in chloroform at 30° C. unless otherwise indicated.

EXAMPLE 1

A glass polymerisation vessel was fitted with a thermometer, stirrer, dropping funnel and gas inlet and outlet tubes. The vessel was flushed with dry oxygen-free nitrogen and then charged with 6.8 parts of heptane and 0.25 part of aluminum triethyl as a solution in 0.68 part of heptane. The vessel was then cooled to —78° C. and a mixture of 5 parts of tetramethyl ethylene oxide and 4.9 parts of cyclohexene oxide was added dropwise over a period of three hours such that the temperature inside the vessel never exceeded —70° C. The vessel was then stirred for a further 4 hours after the addition had been completed in order to complete the polymerisation reaction and thereafter allowed to warm to room temperature and the slurry of polymer in the reaction medium was discharged and broken up in a solution of 15 volumes of hydrochloride acid and 85 volumes of methanol. The polymeric material was filtered from the solution, washed with methanol and dried under vacuum at 45° C. to yield 7 parts of a colourless opaque material melting at 210° C., containing about 50 mole percent of cyclohexene oxide and having an intrinsic viscosity in tetrafluorodichlorobenzene of at least 0.35 measured at 25° C.

The polymer was successfully melt spun at 280° C. through spinnerets with dies of 0.010 and 0.015 inch to give white opaque fibres which could be drawn. These fibres showed no sign of thermal degradation until they attained a temperature of over 300° C. when a slight yellowing occured.

EXAMPLE 2

Using the apparatus and technique described in Example 1 a mixture of 5 parts of tetramethyl ethylene oxide and 5 parts of cyclohexene oxide was added slowly to a solution in heptane of 0.1 part of aluminium triethyl to which an equimolar amount of water had slowly been added previously in accordance with the process described in Example 1 of our patent application No. 46,-587/64. The temperature was kept below —70° C. during the addition by external cooling. At the end of the reaction the polymeric material was broken up in a mixture of hydrochloric acid and methanol, well washed with methanol and dried to yield 7.7 parts of a colourless opaque material having a melting point of 190° C.

EXAMPLE 3

Using the apparatus and technique described in Example 1 a mixture of 6 parts of 4-vinyl cyclohexene-1,2-oxide and 5 parts of tetramethyl ethylene oxide was added slowly to a solution of 0.25 part of aluminium triethyl in 6.8 parts of heptane, keeping the temperature below —70° C. The mixture was stirred for a further 4 hours then the slurry was poured into methanolic hydrochloric acid. The solid product was filtered, washed well with methanol and dried to yield 7.7 parts of white opaque material having a melting point of 170° C.

EXAMPLE 4

A polymerisation tube fitted with stirrer, thermometer, dropping funnel, gas inlet and sealable liquid inlet, was evacuated, flamed out, flushed with dry oxygen-free nitrogen several times and finally filled with dry pure nitrogen. To it were charged n-hexane (10 parts), cyclohexene oxide (5 parts), tetramethyl ethylene oxide (5 parts) and epichlorohydrin (0.5 part), all of which had been distilled from calcium hydride in a stream of nitrogen. This stirred solution was cooled in a bath of acetone/solid carbon dioxide to below —75° C. and to it was added dropwise a solution of aluminium triethyl (0.4 part) in hexane (10 parts) at such a rate that the temperature inside the flask did not exceed —70° C. The resulting polymer suspension was stirred for a further 18 hours at —70° C. and then methanol (50 parts) containing hydrochloric acid (7.5 parts) was added to destroy the catalyst. The polymer was broken up mechanically in methanol and the polymer chips washed well with methanol and dried at 45° in vacuo.

The yield was 6.6 parts of a white tough polymer, crystalline M.P. 155° and flowing at 195°. A film melt pressed at 200° was clear and could be creased and reopened. It had a tensile strength of 1,300 lb./sq. in. Elemental analysis showed a chlorine content of 1.2% by weight.

EXAMPLE 5

Into the apparatus described in Example 4 was charged cyclohexene oxide (5 parts), tetramethyl ethylene oxide (5 parts), pentene-2-oxide as a mixture of the isomers as formed from the oxidation of pentene-2 (0.5 part) and n-hexane (10 parts). The solution was cooled to —75° and to it was added dropwise a solution of aluminium triethyl (0.4 part) in hexane (10 parts) at such a rate as to keep the temperature below —70°. The polymer suspension was stirred for a further 18 hours and then methanolic hydrochloric acid (50 parts) was added to destroy the catalyst. The product was broken up in methanol and the chips washed with methanol and dried in vacuo at 45°. The yield was 5.7 parts of a white tough polymer which softened at 190° and flowed at 240°. It could be formed into a clear film which was more flexible than that obtained from a 50/50 copolymer of tetramethyl ethylene oxide and cyclohexene oxide alone but somewhat less flexible than the film of Example 4.

EXAMPLE 6

Using the method of Example 4, a mixture of cyclohexene oxide (5 parts), tetramethyl ethylene oxide (5 parts) and butene-2-oxide as a mixture of the isomers as formed from the oxidation of butene-2 (0.5 part) in hexane (10 parts) was polymerised at below −70° using aluminium triethyl (0.4 part) in hexane (5 parts) as catalyst. The product was isolated, washed and dried by the method described to give 7.15 parts of very hard polymer. This had a crystalline melting point of 190° C. and flowed at 205°. Films formed from the polymer were more flexible than those obtained from a 50/50 tetramethyl ethylene oxide/cyclohexene oxide copolymer.

By way of comparison, similar experiments containing isobutene oxide (0.5 part) or α-methylstyrene oxide (0.5 part) in place of butene-2-oxide failed to give any polymer.

EXAMPLE 7

In the apparatus previously described, a mixture of cyclohexene oxide (3 parts), tetramethyl ethylene oxide (5 parts) and epichlorhydrin (3 parts) was polymerised at below −70° using as catalyst aluminium triethyl (0.2 part) in n-hexane (5 parts). 9.2 parts of polymer were obtained having a melting point of 170–180° and from which filaments could be melt-spun.

EXAMPLE 8

In the apparatus described in Example 4, a mixture of cyclohexene oxide (10 parts), tetramethyl ethylene oxide (20 parts) and the pentene-2-oxide used in Example 5 (8 parts) in hexane (40 parts) was polymerised at −70° by the slow addition of aluminium triethyl (0.8 part) in hexane (25 parts). The product (18.5 parts) was isolated as described in previous examples. It had a melting point of 185° C. and an intrinsic viscosity of 1.22. A compression-moulded film had a brittle strength of $2.2 \times 10^8$ dynes/cm.$^2$, a modulus of $9 \times 10^9$ dynes/cm.$^2$ and an elongation of 5%.

EXAMPLE 9

In the apparatus described in Example 4 a mixture of tetramethyl ethylene oxide (16 parts), and the pentene-2-oxide used in Example 5 (24 parts) in hexane (40 parts) was cooled to −70° and polymerised by the slow addition of aluminium triethyl (0.8 part) in hexane (40 parts). The polymer (16.6 parts) was isolated as before. It had a melting point of 155°, and an intrinsic viscosity of 1.22.

A compression moulded film had a yield stress of $1.1 \times 10^8$ dynes/cm.$^2$, a modulus of $2.8 \times 10^9$ dynes/cm.$^2$, an elongation at break of 45% and an elongation to yield of 6%.

EXAMPLE 10

The process of Example 9 was repeated using a mixture of tetramethyl ethylene oxide (5 parts) and pentene-2-oxide (5 parts). 5 parts of polymer were obtained having the following properties: melting point 155–165°, intrinsic viscosity 2.07.

A solvent cast film had the following properties: yield stress $2.3 \times 10^8$ dynes/cm.$^2$, modulus $5.5 \times 10^9$ dynes/cm.$^2$, elongation at break 200–550%.

EXAMPLE 11

In the apparatus described in Example 4, a mixture of cyclohexene oxide (4 parts) tetramethyl ethylene oxide (5 parts) and 4-methyl pentene-2-oxide (1 part of the mixture of isomers obtained by oxidising 4-methyl pentene-2) in heptane (10 parts) was polymerised by a solution of aluminium triethyl (0.2 part) in heptane (10 parts).

The polymer (6.9 parts), had a melting point of 210°, a brittle strength of $2.4 \times 10^8$ dynes/cm.$^2$, a modulus of $1.5 \times 10^{10}$ dynes/cm.$^2$ and an elongation of 1.7%. It gave a clear film when hot pressed.

EXAMPLES 12–16

The process of Example 4 was repeated a number of times using varying concentrations of TMO and epichlorhydrin. The polymerisation was effected in hexane (25 parts) using aluminium triethyl (0.8 part), as catalyst at −70°. The other process details and certain properties of the products are tabulated as follows:

| | | | Polymer properties | | |
|---|---|---|---|---|---|
| Example: | TMO, parts | Epichlorhydrin, parts | Yield, parts | Melting point, °C. | Intrinsic viscosity | Chlorine content, percent by weight |
| 12 | 6 | 4 | 4.2 | 163 | 1.69 | 16.02 |
| 13 | 5 | 5 | 4.0 | 183 | 1.38 | 15.78 |
| 14 | 4 | 6 | 2.75 | 185 | 1.92 | 17.48 |
| 15 | 7 | 3 | 4.2 | 195 | 0.4 | 13.97 |
| 16 | 8 | 2 | 3.8 | 190 | Insoluble | 11.63 |

The best sample for mechanical properties was that obtained from Example 14, containing the smallest amount of tetramethyl ethylene oxide and also having the highest intrinsic viscosity. Samples of the polymers from Examples 12, 13, and 14 gave clear, tough films when cast from chloroform.

I claim:
1. A copolymeric polyether of improved thermal stability and a melting point of at least 150° C., derived by polymerising a mixture comprising:
   (A) from 25% to 75% by weight of tetramethylethylene oxide, and
   (B) from 75% to 25% by weight of oxirane material selected from the group consisting of
      (i) at least one cyclic 1,2-epoxide having the structure

$$H-C \overset{O}{\underset{R}{\diagup\!\!\!\diagdown}} C-H \quad (I)$$

where R is a divalent hydrocarbon radical having a chain of from 3 to 6 carbon atoms linking the epoxidised carbon atoms,
      (ii) at least one epihalohydrin,
      (iii) at least one 1,2-epoxide having the structure $$CH_3-CH \overset{O}{\diagup\!\!\!\diagdown} CH-CH \diagdown_{R_2}^{R_1}$$

where each of $R_1$ and $R_2$ is selected from the group consisting of hydrogen atoms and methyl groups, and
      (iv) mixture of (a) at least one 1,2-epoxide having the structure I with (b) at least one 1,2-epoxide selected from the groups consisting of epihalohydrins and 1,2-dialkylethylene oxides, the amount of (b) forming from 2 to 15% of the total weight of (A) and (B).

2. A copolymer as claimed in claim 1 in which the cyclic 1,2-epoxide is selected from the group consisting of cyclohexene-1,2-epoxide, 4-vinylcyclohexene-1,2-epoxide and mixtures thereof.

3. A copolymer as claimed in claim 2 wherein the mixture contains from 1 to 10% by weight of 4-vinylcyclohexene-1,2-epoxide, from 30% to 50% by weight of cyclohexene-1,2-epoxide and from 40% to 60% by weight of tetramethylethylene oxide, the amounts being chosen to total 100%.

4. A copolymer as claimed in claim 2 having an intrinsic viscosity, measured on a solution thereof in chloroform at 30° C., of at least 1.0.

5. A film of fibre of a solid copolymer as claimed in claim 2.

6. A cross-linked composition derived from a copolymer as claimed in claim 2 which contains residues of 4-vinyl cyclohexene-1,2-epoxide.

7. A copolymer as claimed in claim 1 wherein the mixture comprises (A) from 25% to 75% by weight of tetramethylethylene oxide, and (B) from 75% to 25% by weight of a mixture comprising (a) cyclohexene-1,2-epoxide and (b) at least one epoxide selected from the group consisting of epihalohydrins and 1,2-dialkylethylene oxides; the amount of (b) forming from 2 to 15% of the total weight of (A) and (B).

8. A copolymer as claimed in claim 7 in which the epoxide (b) is selected from the group consisting of epichlorohydrin, epibromohydrin and 1,2-epoxides having the structure:

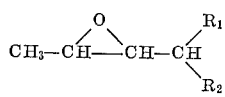

where $R_1$ and $R_2$ are each selected from the group consisting of hydrogen atoms and methyl groups.

9. A copolymer as claimed in claim 7, where at least some of the cyclohexene-1,2-epoxide in the mixture is replaced by 4-vinylcyclohexene-1,2-epoxide; and said 4-vinylcyclohexene-1,2-epoxide forming from 1 to 10% by weight of the mixture.

10. A copolymer as claimed in claim 7 wherein the mixture contains about 50 mole percent of tetramethylethylene oxide.

11. A film or fibre of a solid copolymer as claimed in claim 7.

12. A melt adhesive containing a copolymer of tetramethylethylene oxide, cyclohexene-1,2-epoxide and at least one 1,2-epoxide having the structure

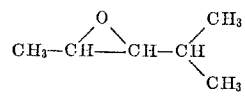

13. A copolymer as claimed in claim 1 wherein the mixture comprises (A) tetramethylethylene oxide and (B) epichlorohydrin.

14. A copolymer as claimed in claim 13 having an intrinsic viscosity, measured on a solution thereof in chloroform at 30° C., of at least 0.8.

15. A film of a copolymer as claimed in claim 14.

16. A process for preparing a copolymer as claimed in claim 1 in which the polymerization is effected below −70° C. in the presence of from 1 to 25 parts by weight of inert organic solvent for each part by weight of polymerisable mixture, and in the presence of an initiator which is a metal alkyl wherein the metal is aluminium or a metal of Group 2 of the Periodic Table, and is present in a concentration of from 0.01 to 10 moles per 100 moles of polymerisable material.

17. A process as claimed in claim 16 in which the initiator is aluminium triethyl.

References Cited

UNITED STATES PATENTS 3,285,893 11/1966 Vandenberg _____ 260—2EP
3,324,051 6/1967 Lal _____ 260—2EP

OTHER REFERENCES

Polyethers III: Ishida, S., vol. 33, No. 7 (pp. 924–929). July 1960.

WILLIAM SHORT, Primary Examiner

T. E. PERTILLA, Assistant Examiner

U.S. Cl. X.R.

260—88.3